(12) United States Patent
Taylor

(10) Patent No.: US 7,407,216 B2
(45) Date of Patent: Aug. 5, 2008

(54) FRAME FOR BUILDING A VEHICULAR BODY WITH A LOAD BEARING SUPPORT SYSTEM

(75) Inventor: William Taylor, Linden, NJ (US)

(73) Assignee: JDM Venture, LLC, Belle Harbor, NY (US)

( * ) Notice: Subject to any disclaimer, the term of this patent is extended or adjusted under 35 U.S.C. 154(b) by 222 days.

(21) Appl. No.: 11/203,778

(22) Filed: Aug. 15, 2005

(65) Prior Publication Data

US 2006/0033360 A1 Feb. 16, 2006

Related U.S. Application Data

(60) Provisional application No. 60/601,514, filed on Aug. 13, 2004.

(51) Int. Cl.
*B62D 33/00* (2006.01)

(52) U.S. Cl. .................................. 296/182.1; 296/181.2

(58) Field of Classification Search .................... 296/3, 296/26.02, 26.03, 36, 43, 181.1, 182.1, 183.1, 296/18.6, 186
See application file for complete search history.

(56) References Cited

U.S. PATENT DOCUMENTS 7,182,396 B2 * 2/2007 Taylor ..................... 296/182.1

* cited by examiner

*Primary Examiner*—Lori L Lyjak
(74) *Attorney, Agent, or Firm*—Fulbright & Jaworski LLP

(57) ABSTRACT

A skeleton or frame for building a vehicular body of a cargo vehicle with a load bearing support system for supporting one or more levels of accessories to provide one or more additional levels of load bearing surfaces. The frame comprises at least two side portions comprising a plurality of longitudinally spaced sidewall posts and at least one transverse member connecting the two side frames for mounting various panels (e.g., a roof, floor, wall, door, window, sunroof, refrigerator unit, air conditioner unit, etc.) and accessories (e.g., a shelf, drawer, bin, cabinet, platform, cot, sliding rack, bucket, bench and the like).

42 Claims, 16 Drawing Sheets

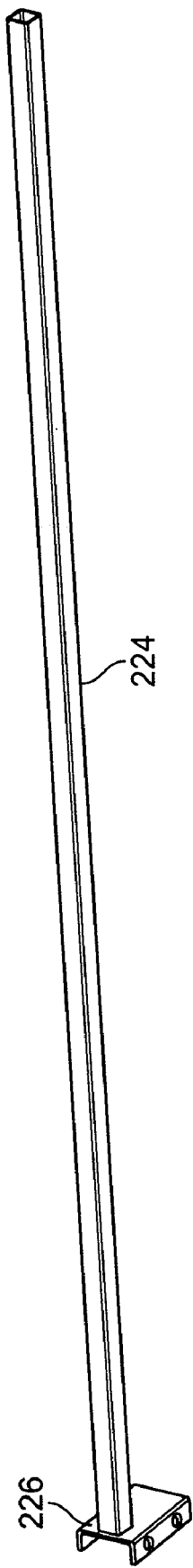
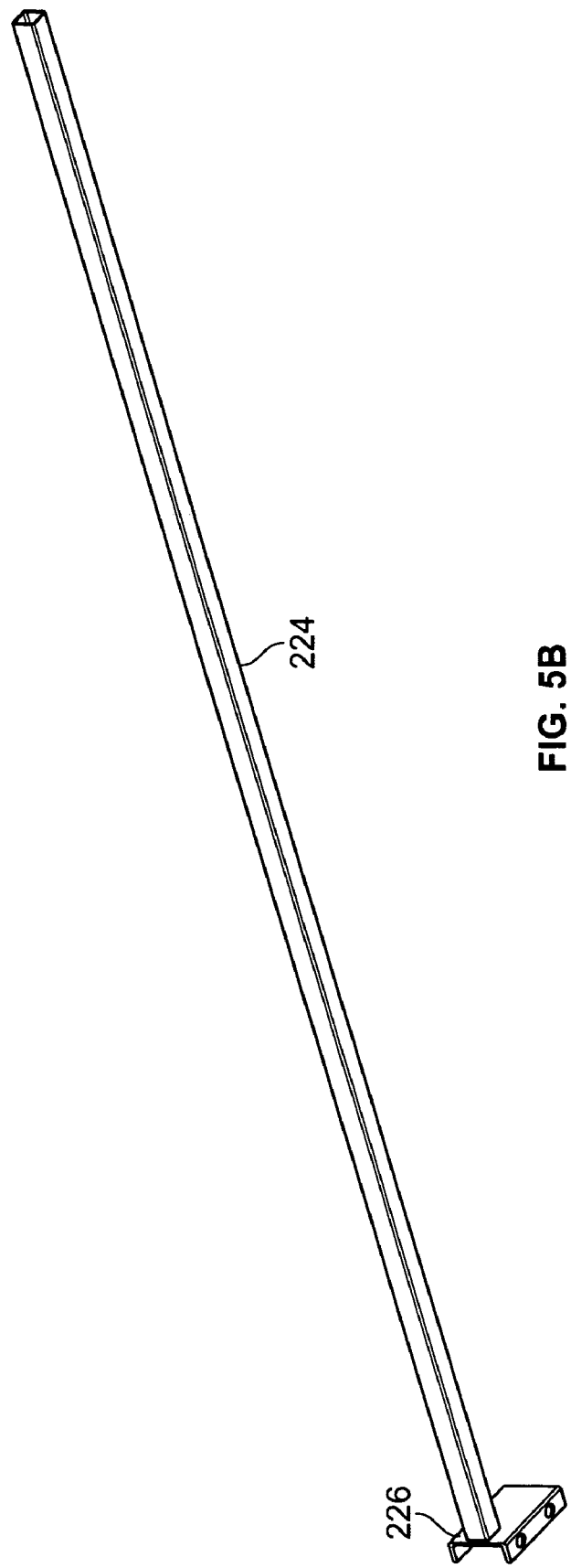
FIG. 5A
FIG. 5B

FRAME FOR BUILDING A VEHICULAR BODY WITH A LOAD BEARING SUPPORT SYSTEM

RELATED APPLICATION(S)

This application claims priority benefit under Title 35 U.S.C. § 119(e) of provisional application No. 60/601,514, filed Aug. 13, 2004, which is incorporated by reference in its entirety.

BACKGROUND OF THE INVENTION

The present invention relates generally to a vehicular body frame, more particularly, to a frame for building a vehicular body with a load bearing support system for use in cargo vehicles.

Although a large variety of box truck designs exist, they all include the common features of large interior space defined by the sidewalls, front and back walls, a roof, and a floor. The steel truck mainframe supports the flooring, which can include a wooden or metal platform secured to the main frame. The floor is normally bowed from front to rear in order to compensate for and provide some flexibility for heavy loads carried within the cargo area. The sidewalls and roof usually comprise material with little load bearing capability, such as fiberglass, plywood, thin sheet metal, fiberglass reinforced plywood, etc. The primary cargo load bearing structure for trucks of this type include the flooring and main frame. Typically, metal steel or aluminum bars mount at the box corners and along the edges of the box for the purpose of transferring carrying forces outward and downward to the main frame. Also, the sidewalls have been corrugated with vertically extending channels, or a portion of the sidewall may be fitted with a series of longitudinally spaced vertically extending channel members riveted to the inside or outside of the side walls, in an attempt to strengthen the sidewalls. However, these measures are generally ineffective in strengthening the sidewalls for carrying loads.

The box trucks have great utility, particularly for delivery companies that pickup, haul, and deliver a number and variety of packages of varying sizes, shapes, and weight. Currently, these cargo boxes and box trucks do not come with pre-built support system. The support system is generally individually built and installed by third parties after the cargo boxes and box trucks are built by the manufacturer. There is currently no standardized frame that can be used to build a vehicular body with a load bearing support system.

Currently, there is no mechanism to quickly and efficiently assemble or construct a permanent or temporary building structure with a load bearing system. Accordingly, the present invention proceeds upon the desirability of providing a skeleton or frame for mounting walls, roof, window, door, floor to build a mobile, permanent or temporary building structure (e.g., shed, warehouse, enclosure, shack, office, classroom, show room, exhibition hall, booth, garage, a field hospital, clinic, modular building structure and the like, collectively referred to herein as an enclosed structure) with a load bearing support system. The load bearing support system of the present invention provides one or more levels of accessories, such as shelves, hooks, racks, platforms, bins, drawers, cots, cabinets, sliding racks, hangars, benches and the like within and/or outside the building structure. Preferably, accessories can easily and reliable rotated or moved to their stored or utility positions. Also, the accessories are removably attachable so that they can be easily and efficiently reconfigured to meet a particular application.

Further, the present invention proceeds upon the desirability of providing a frame for mounting panels, sidewalls, roof and floor to build a vehicular body of a cargo box or cargo vehicle and mounting a load bearing support system for use in such cargo box or cargo vehicle. The load bearing support system of the present invention provides one or more levels of accessories, such as shelves, hooks, racks, sliding racks, cabinets, platforms, bins, drawers, cots, hangars, benches and the like within and/or outside the cargo area of the vehicle. Preferably, accessories can be easily and reliably rotated to their stored and utility positions. Also, the accessories are removably attachable so that they can be easily and efficiently reconfigured to meet a particular cargo or storage need. For example, one or more shelves can be moved up or down to accommodate varying sized packages.

OBJECTS AND SUMMARY OF THE INVENTION

Therefore, it is an object of the present invention to provide a frame or skeleton for building a vehicular body of cargo box or vehicle with a load bearing support system that overcomes the aforementioned shortcomings of the present cargo vehicles and cargo box.

Another object of the present invention is to provide the frame as aforesaid, wherein the load bearing support system utilizes substantially all of the cargo space of the vehicle, both vertically and horizontally.

Further object of the present invention is to provide the frame as aforesaid, wherein the load bearing support systems provides one or more levels of load bearing surfaces. The additional levels of load bearing surfaces can be benches, cots, shelves, platforms, bins, drawers, cabinets, sliding racks and the like.

Still another object of the present invention is to provide the frame as aforesaid, wherein the vehicular body parts, such as side walls, end panels, floor, roof, door, windows, racks and the like are mountable onto the frame.

Once the frame of the present invention is built and installed on the cargo vehicle, the accessories, such as shelves, platforms, benches, cots, bins, drawers, hangars, sliding racks, cabinets, hooks, etc., can be easily mounted to the frame as more fully described herein. This procedure reduces the amount of time and labor needed to complete the installation.

In accordance with an embodiment of the present invention, the frame comprises a series of longitudinally spaced load bearing vertical members formed into at least two opposing side portions. The vertical members of the respective opposing side portions are connected by one or more stabilization bar members to provide stability and alignment. For a cargo vehicle application, each side portion is supported directly by the vehicular chassis. Transverse members extending across the cargo area couple directly or indirectly to the top portions of the opposing vertical members in the respective opposing side portions and preferably support the roof.

In accordance with an embodiment of the present invention, the frame for building a vehicular body of a cargo box or vehicle with a load bearing support system as aforesaid comprises a number of brackets for connecting and supporting multiple levels of accessories, such as shelves, platforms, benches, bins, drawers, sliding racks, hangars, cabinets, hooks, etc. One end of the bracket forms a pair of opposed ears that fit on either side of the vertical member channel or rib. The upper part of the ears pivot about the axis of a longitudinal bolt or pin held in the vertical member. In the down or utility position, the bracket abuts the channel or rib inboard face. The bracket can rotate upward about the through bolt to the storage position where it can be held safely by a suitable device in the storage position. One shelf section preferably spans and connects to at least two brackets. A series of vertically spaced holes in the vertical member and through bolts can be provided to enable vertical adjustment and mounting of the various shelves simply by removing and repositioning the through bolt to a different vertical member through hole.

An embodiment of the present invention comprises a process for manufacturing a frame for building a vehicular body of a cargo box or vehicle with a load bearing support system. This process comprises the step of assembling at least two side portions, which include two or more longitudinally spaced vertical members. Each vertical member is connected to another vertical member within each respective side portion by one or more stabilization bar members. The stabilization bars provide stability and alignment of the longitudinally spaced vertical members. Additionally, the process comprises the step of connecting the opposing vertical members in the respective opposing side portion by at least one transverse member to form a frame for building a vehicular body with a load bearing support system for supporting one or more levels of accessories. Thereby, the frame for building a vehicular body with a load bearing support system provides one or more additional levels of load bearing surfaces for the cargo vehicle.

An embodiment of the present invention comprises a kit for assembling the frame for building a vehicular body with a load bearing support system for use in a cargo vehicle. The kit comprises one or more load bearing vertical members for forming at least two opposing side portions; one or more stabilization bar members for connecting the vertical members of each respective side portion; and at least one transverse member for connecting the opposing vertical members in the respective opposing side portion to form a frame for building a vehicular body with a load bearing support system for supporting one or more levels of accessories. Thereby, the frame for building a vehicular body with a load bearing support system provides one or more additional levels of load bearing surfaces. The kit can comprise members of the frame which are manufactured in a predetermined size and cut accordingly to build cargo boxes with varying dimensions and features. Alternatively, the kit can comprise members that are manufactured in a number of predetermined sizes to build cargo boxes with various dimensions and features. The kit also comprises instructions for assembling the frame to build a vehicular body having a load bearing support system of the present invention.

In accordance with an embodiment of the present invention, the frame for building a vehicular body with a load bearing support system of the present invention as aforesaid, further comprises a plurality of open bins as the accessories. This embodiment of the invention allows a cargo vehicle, cargo box, or shed, and the like, to become a showroom to display products to customers.

In accordance with an embodiment of the present invention, the frame for building on vehicular body with a load bearing support system comprises a side portion with at least one cross brace form of at least two stabilization bar members. The ends of the each stabilization bar member can be attached to different vertical members within the same side portion. Additionally, the stabilization bar members can be attached to each other where they cross, or to another vertical member, or to both.

In accordance with an aspect of the present invention, the cross brace can be formed from at least two transverse members. Each transverse member can be attached to the stabilization bar member or to top of the vertical member of the frame. Each end of the respective cross brace can be attached to a different vertical member or to a different stabilization bar member. The transverse members can be constructed and attached in a way to facilitate expansion and contraction of the present invention. The attached cross brace provides added stability and facilitates the load bearing aspect of the present invention.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which:

FIG. 5A-5B are perspective views of an embodiment of the transverse member 220 of the present invention;

DETAILED DESCRIPTION OF THE EMBODIMENTS

The frame or skeleton 200 for building a vehicular body with a load bearing support system 205 of the present invention is applicable to box trucks, as well as any mobile workshops, delivery, service, and cargo vehicles, such as trailers, vans, trains, planes, freights, container vessels, ships and the like. Further, the frame or skeleton 200 for building an enclosed structure 600 with a load bearing support system of the present invention is applicable to building a field hospital, a garage, a shed, a warehouse, a box car, a trailer box, a cargo box and the like.

Figure 8:
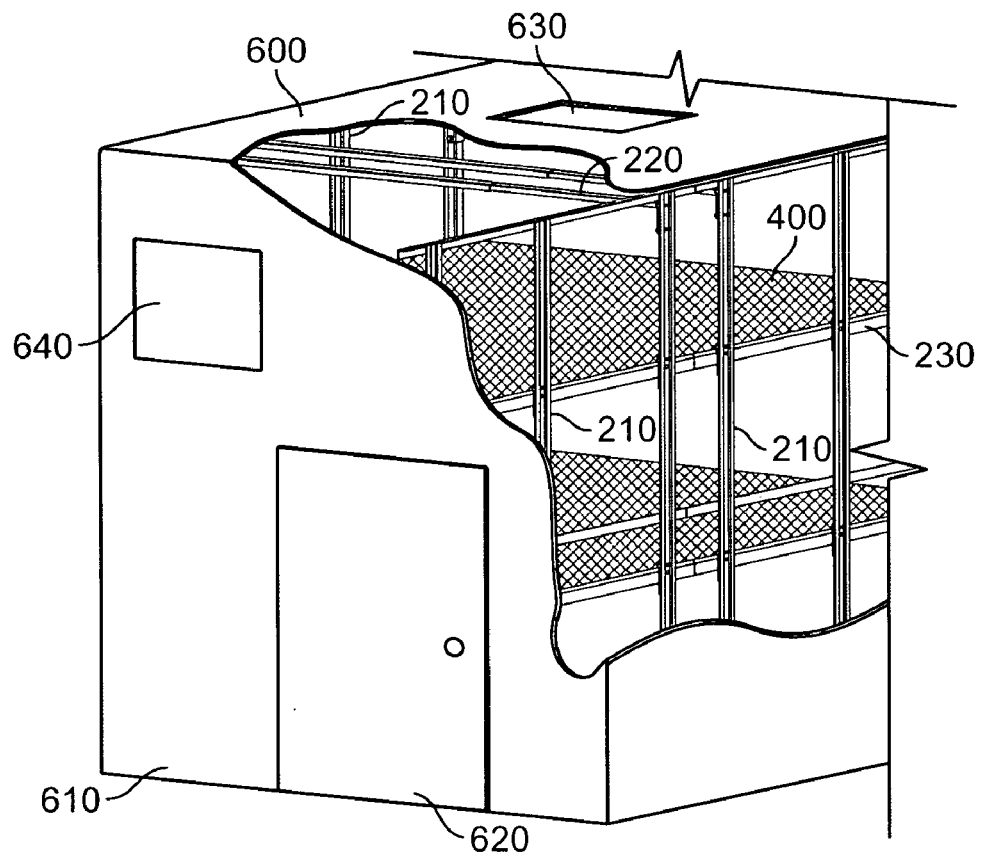
FIG. 8 is a pictorial perspective view of an enclosed structure without the right side wall built using the frame with a load bearing support system in accordance with an embodiment of the present invention.

A box truck 100 and an enclosed structure 600 incorporating the skeleton or frame 200 for building a vehicular body 610 or exterior panels 610 with a load bearing support system 205 in accordance with an embodiment of the present invention, is shown in FIGS. 1, 2, 8 and 10-14. The frame 200 of the present invention having a load bearing support system 205 can be used to mount or build a vehicular body, such as sidewalls 110 (only one shown for clarity in FIG. 2), a rear wall 120, a front wall 130, a roof 150, a floor 140 preferably with wheel wells 160, a fuel port cover 170 and one or more doors (not shown) on the rear wall 120 and/or one of the sidewalls 110. In accordance with an embodiment of the present invention, as shown in FIG. 8, the frame 200 having a load bearing support system 205 can be used to mount exterior panels 610 (e.g., roof 150, door 620, walls, floor 140, window 640, sunroof 630, roll-on-cover 650 and the like).

In accordance with an embodiment of the present invention, as shown in FIGS. 1, 2, 8 and 10-14, the frame 200 comprises a plurality of sidewall posts 210, one or more transverse members 220, and one or more stabilization bar members 230 to form a load bearing support system 205. The sidewall posts 210 support the accessories, such as shelves 400 (and other accessories (not shown), including but not limited to benches, racks, sliding racks, cabinets, bins, buckets, cots, hangars, hooks, platforms, drawers, and like), and transfer the dynamic and static loads directly onto the floor 140 of the enclosed structure 600 or the floor 140 and/or mainframe/chassis of the box truck 100. The sidewall posts 210, transverse members 220, accessories or shelves 400, stabilization bar members 230 and other components noted herein are made, formed or molded of suitable load bearing material including but not limited to metal (i.e., steel, galvanized steel, aluminum, etc.), wood, vinyl, plastic, plastic resin, fiberglass, fiberglass reinforced plywood (FRP) and the like.

It is appreciated that the longitudinal spacing between the sidewall posts 210 and the number of sidewall posts 210 can vary to build vehicular body of varying dimensions, i.e., the cargo area or the length of the box truck 100 or the enclosed structure 600. That is, the longitudinal spacing and the number of sidewall posts 210 can be selected based on the desired dimensions of the cargo area of the cargo vehicle 100 or the enclosed structure 600.

Figure 1:
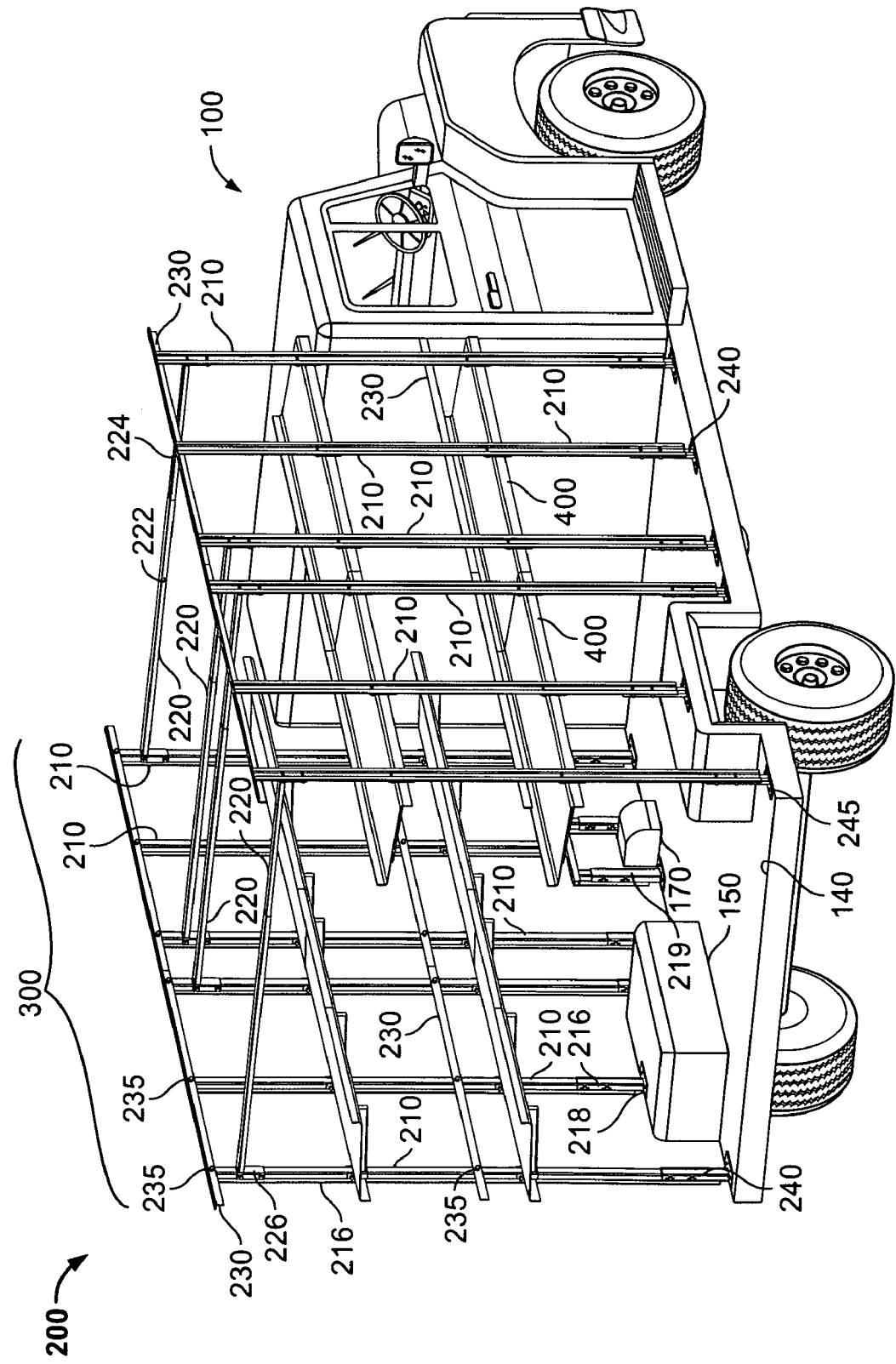
FIG. 1 is a pictorial perspective view of a box truck without the walls/roof of the cargo area incorporating an embodiment of the frame or skeleton for building a vehicular body cover or panel with a load bearing support system of the present invention supporting multiple levels of shelves 400.

Each sidewall post 210 in the set is connected to other sidewall posts 210 in the set by one or more stabilization bar members 230 to form a side portion 300. The panels 610 are mounted thereon to form a side panels or sidewalls 110, a rear wall 120 and a front wall 130. In accordance with an embodiment of the present invention, the side panels or sidewalls 110 can be constructed in predetermined dimensions and one or more side potion 300 can be connected, such as using one or more stabilization bar members 230, to vary the length of the side portion 300 for a particular application. It is appreciated that the respective sidewalls 300 can have the same or different number of the sidewall posts 210, e.g., to account for a side door on one of the sidewalls 110. Preferably, one or more sidewall posts 210, in the respective sidewalls posts 110 mounted on the side portion 300 of the frame 200, are located in laterally respective opposing position. The stabilization bar members 230 are used to maintain the predetermined longitudinal spacing between the sidewall posts 210 and to provide alignment and stability. For example, as shown in FIG. 1, each sidewall posts 210 can be connected to another sidewall posts 210 in the set by at least two stabilization bar members 230, the first stabilization bar member 230 connecting the top portion of the sidewall posts 210 of the side portion 300 and the second stabilization bar member 230 connecting the middle or bottom portion of the sidewall posts 210 of the side frame 300. The stabilization bar members 230 can be connected to the vertical members 210 using self-locking bolts, bolts and nuts, latches, clasps, clips or any other comparable fastening means. In accordance with an aspect of the present invention, the first stabilization bar member 230 is angled, i.e., L-shaped, so as to cover the top of the sidewall posts 210, as shown in FIG. 1.

In accordance with an embodiment of the present invention, the sidewall posts 210 can be formed or molded as an elongated tube, post or channel 212, comprising one or more face portions 213 and two opposing side portions 215 having a plurality of predetermined spaced holes or openings 216 to receive any known connection or mounting means, including but not limited to bolts, pins, clips, rivets, clasps, etc. Exemplary sidewall posts 210 are shown in FIGS. 3A-D and 4, such as a rectangular tube or post, a u-shaped channel, or a u-shaped channel having side flanges and the like. Preferably, each sidewall posts 210 has at least two predetermined spaced holes or openings 214 on the face portion 213 to facilitate easy and quick installation of the first and second stabilization bar members 230 via any known connection and mounting means. For example, the openings 214 and 216 in the vertical members can be threaded to receive a bolt 235 or the like, the sidewall posts 210 can be formed or molded with nuts (not shown) behind and axially aligned with the openings 214 and 216, or the nuts can be welded onto the sidewall posts 210 so that bolts 235 with lock washers (or self-locking bolts) can be easily and quickly threaded into the nuts to secure the stabilization bar member 230 onto the sidewall posts 210.

Figure 2:
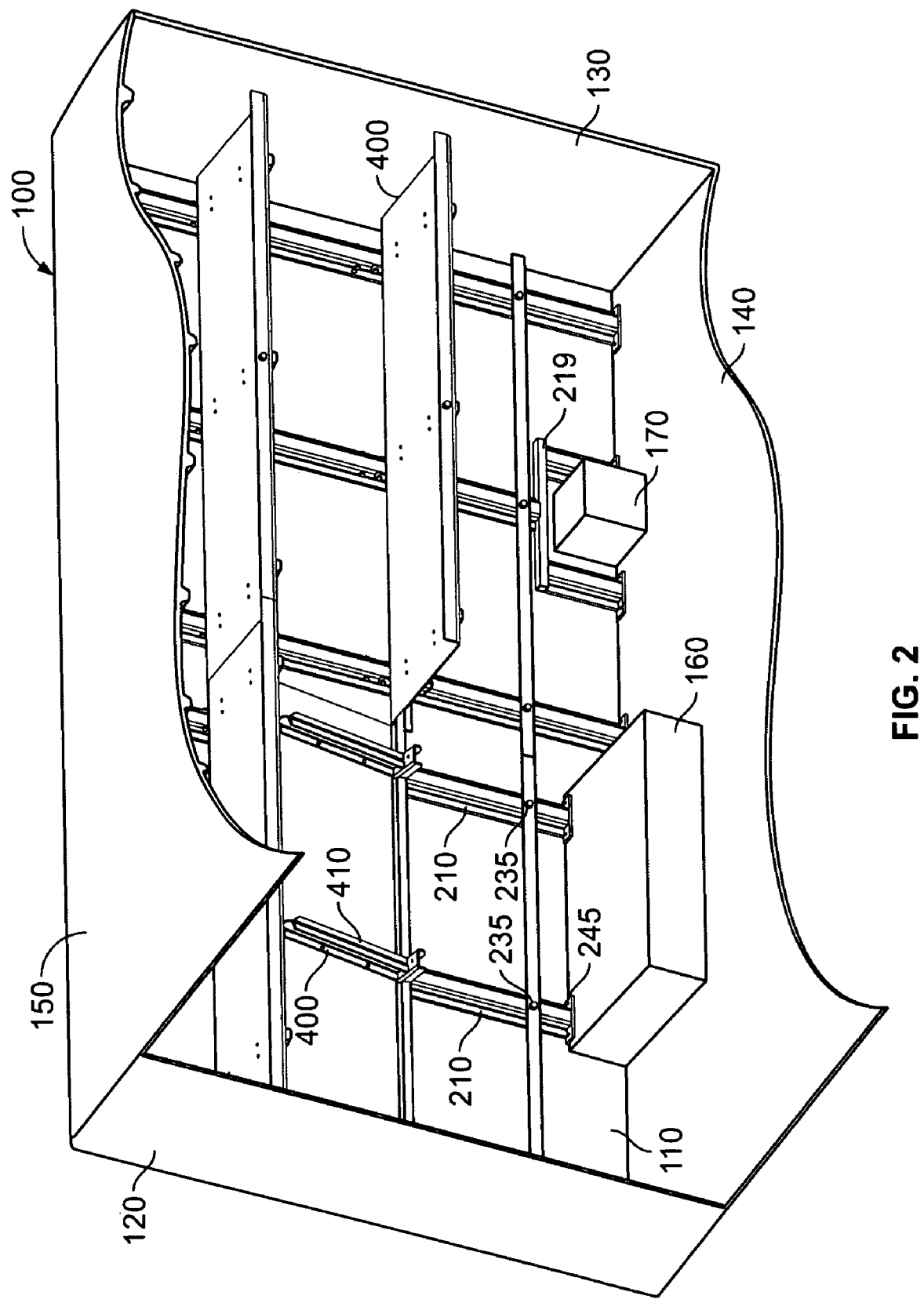
FIG. 2 is a cut-a-way perspective view of a cargo area of the box truck, cargo box, shed or modular building structure incorporating an embodiment of the frame or skeleton for building a movable, permanent or temporary structure with a load bearing support system of the present invention.
Figure 14:
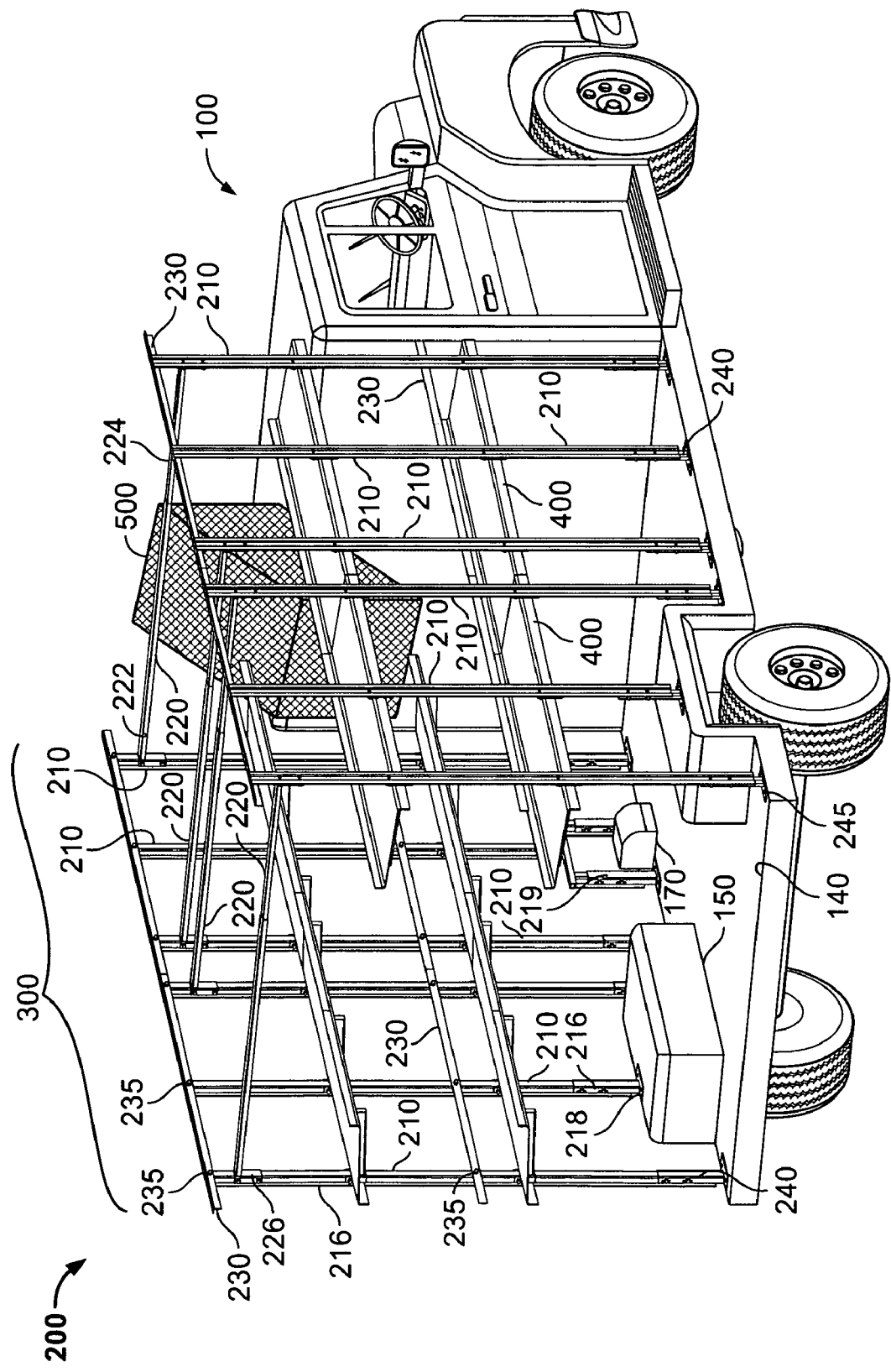
FIG. 14 is a pictorial perspective view of a box truck without the walls/roof of the cargo area constructed using the frame with a load bearing support system in accordance with embodiment of the present invention comprising multiple levels of shelves 400 and a refrigerator or air conditioner unit 500.

In accordance with an embodiment of the present invention, the sidewall posts 210, stabilization bar members 230, and the transverse members 220, can be manufactured in a predetermined size and cut accordingly to fit a particular application, i.e., cut to build the box truck 100 of varying dimensions and features including the refrigeration or air conditioner unit 500 (as shown in FIG. 14), a window (not shown), a door (not shown), or provide the cargo floor 140 with a bowed design (the arc in the floor 140 is not shown in FIGS. 1 and 2). Alternatively, the sidewall posts 210, the stabilization bar members 230, and the transverse members 220, can be manufactured in a number of predetermined sizes to provide the cargo space of varying dimensions and features. In accordance with an embodiment of the present invention, the sidewall post 210 comprises a telescopic inner portion and a telescopic outer portion (not shown), wherein the outer portion slides over the inner portion in one direction to shorten the sidewall posts 210, and slides in the other direction to lengthen the sidewall posts 210.

Once the side portion 300 are constructed, e.g., two side portions 300 for the box truck application or the building structure application (e.g., a shed, a field hospital, a warehouse, a modular building structure, a temporary building, etc.), they are connected using one or more transverse members 220 to form a frame 200 for mounting panels or vehicular body covers 610 with a load bearing support system 205 of the present invention. In accordance with an embodiment of the present invention, a transverse member 220 connects a sidewall posts 210 in one side portion 300 to a sidewall posts 210 in the other side portion 300, which are located in laterally respective opposing positions. Preferably, one or more transverse members 220 are used to connect one or more laterally respective sidewall posts 210 in the opposing side portion 300. In an exemplary box truck application, as shown in FIG. 1, four transverse members 220 are used to connect four laterally respective sidewall posts 210 in the opposing side portion 300 to form a frame or skeleton 200 for a vehicular body covers or panels 610 with a load bearing support system 205 of the present invention. Alternatively, one or more transverse members 220 are connected to the respective first stabilization bar member 230 located near the top of the opposing side portions 300 (not shown).

In accordance with an embodiment of the present invention, as shown in FIGS. 1 and 5A-B, the transverse member 220 can be formed or molded as an elongated beam, strut, rib, tube, and the like, having a bracket 226 at each end. Alternatively, the brackets 224 are welded, riveted or connected by other comparable means to each end of the transverse member 220. The brackets 226 are used to connect the transverse members 220 to the sidewall posts 210 by any known means, such as bolts/nuts, clips, latches, hooks, rivets, depressions/protrusions which, clips or fits into one or more openings 214 or 216 on the sidewall posts 210. Preferably, the bracket 226 can be formed or molded as a u-channel comprising a face portion 227 and two opposing side portions 228, for securing the transverse member 220 to the sidewall posts 210.

In accordance with an embodiment of the present invention, the bracket 226 comprises one or more holes or openings 229 on its opposing side portions 228 and/or one or more holes on its face portion 227 (not shown). The holes 229 on the respective opposing side portions 228 of the bracket 226, and the holes 216 on the respective opposing side portions 215 of the sidewall posts 210, are axially aligned. As shown in FIG. 1, the bracket 226 is then bolted or screwed (or by other comparable means) onto the sidewall posts 210 through the axially aligned holes to securely attach the transverse member 220 to the sidewall posts 210. Alternatively, the holes on the face portion 227 of the bracket 226, and the holes 214 on the face portion 213 of the sidewall posts 210, are axially aligned. The bracket 226 is then bolted or screwed (or by other comparable means) onto the sidewall posts 210 through the axially aligned holes to securely attach the transverse member 220 to the sidewall posts 210.

In accordance with an embodiment of the present invention, the transverse member 220 comprises a telescopic inner member 224 and a telescopic outer member 222. The proximal end of the inner member 224 is inserted inside the outer member 222 via its proximal end to adjust the length of the transverse member 220. Each inner member 224 and outer member 222 comprises a bracket 226 at its distal end, which can be formed or molded together with its corresponding inner member 224 and outer member 222. Alternatively, the brackets 226 are welded, riveted, or connected by other comparable means to the distal ends of the inner members 224 and outer members 222, respectively. The length of the transverse members 220 can be adjusted by inserting or pulling the inner member 224 further into or out of the outer member 222. For example, the proximal end of the inner member 224 is inserted deeper into the outer member 222 to shorten the transverse member 220, and vice-versa, to lengthen the transverse member 220. In accordance with an embodiment of the present invention, opposing faces of the inner members 224 and outer members 222 comprise a plurality of hole pairs, preferably near the proximal end, for securing the outer member 222 to the inner member 224 to maintain desired length of the transverse member 220. Preferably, the inner member 224 has a plurality of hole pairs and the outer member 222 has two hole pairs, as shown in FIG. 5A. For example, the outer members 222 can be formed or molded with nuts 223 on one of the opposing faces having the holes and each nut 223 being axially aligned with one of the holes. Alternatively, the nuts 223 can be welded onto the outer members 222 so that self-locking bolts (not shown), or bolts with lock washers (not shown), can easily and quickly be inserted through matching hole pairs of the inner members 224 and outer members 222 and threaded into the nuts to secure the outer member 222 to the inner member 224. Conversely, the inner member 224 can have a plurality of holes and the outer member 222 can include clips which can be removably inserted into the holes of the inner member 224 to adjust the length of the transverse member 220 and securely connect the outer member 222 to the inner member 224.

Figure 10:
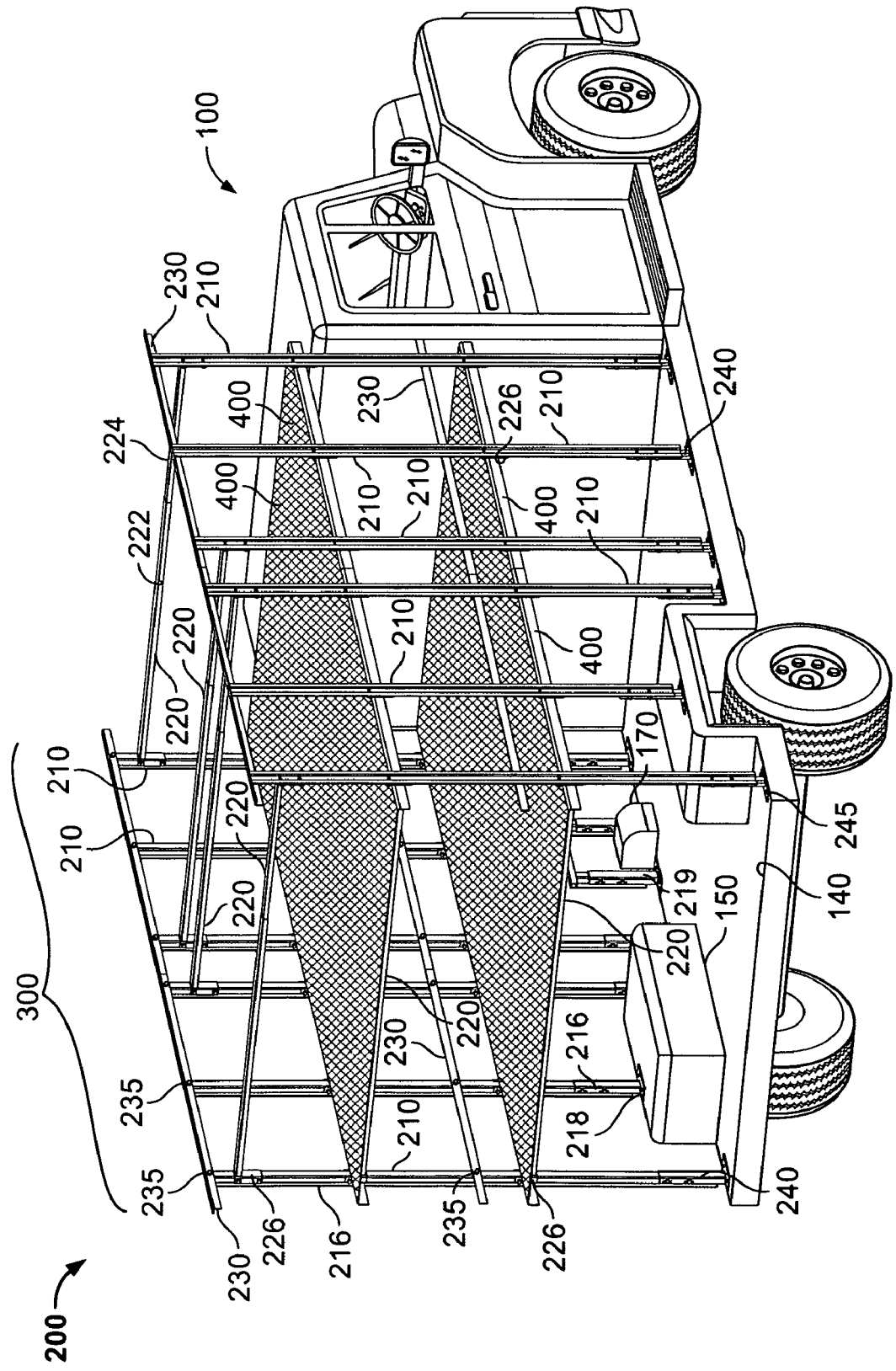
FIG. 10 is a pictorial perspective view of a box truck without the walls/roof of the cargo area incorporating a frame in accordance with an embodiment of the present invention for building body covers, panels or shells with a load bearing support system comprising multiple platforms 400.

Once the frame 200 for building an enclosed structure 600 or a vehicular body with a load bearing support system 205 of the present invention is built, the panels or body covers 610 (e.g., floor, sidewalls, roof, front wall, rear wall, doors, windows and the like), the accessories 400 (e.g., shelves, benches, hangars, drawers, platforms, hooks, clips, bins, buckets, cots, racks, sliding racks, cabinets and the like), the transverse member 220, inner member 224, outer member 222, and support arms 420 can be mounted on the opposite sides of the sidewall posts 210 forming or defining the cargo space or area 210, to provide one or more additional levels of load bearing surfaces (depending on the particular application of the present invention). For example, as shown in FIG. 10, one or more transverse members 220 can be connected at different levels of the sidewall posts 210 to provide one or more levels of load bearing surfaces or platforms 400 in addition to the floor 140 of the cargo vehicle 100. It is appreciated that such multiple platforms 400 can be used to transport breads, bakery goods and the like.

Figure 6:
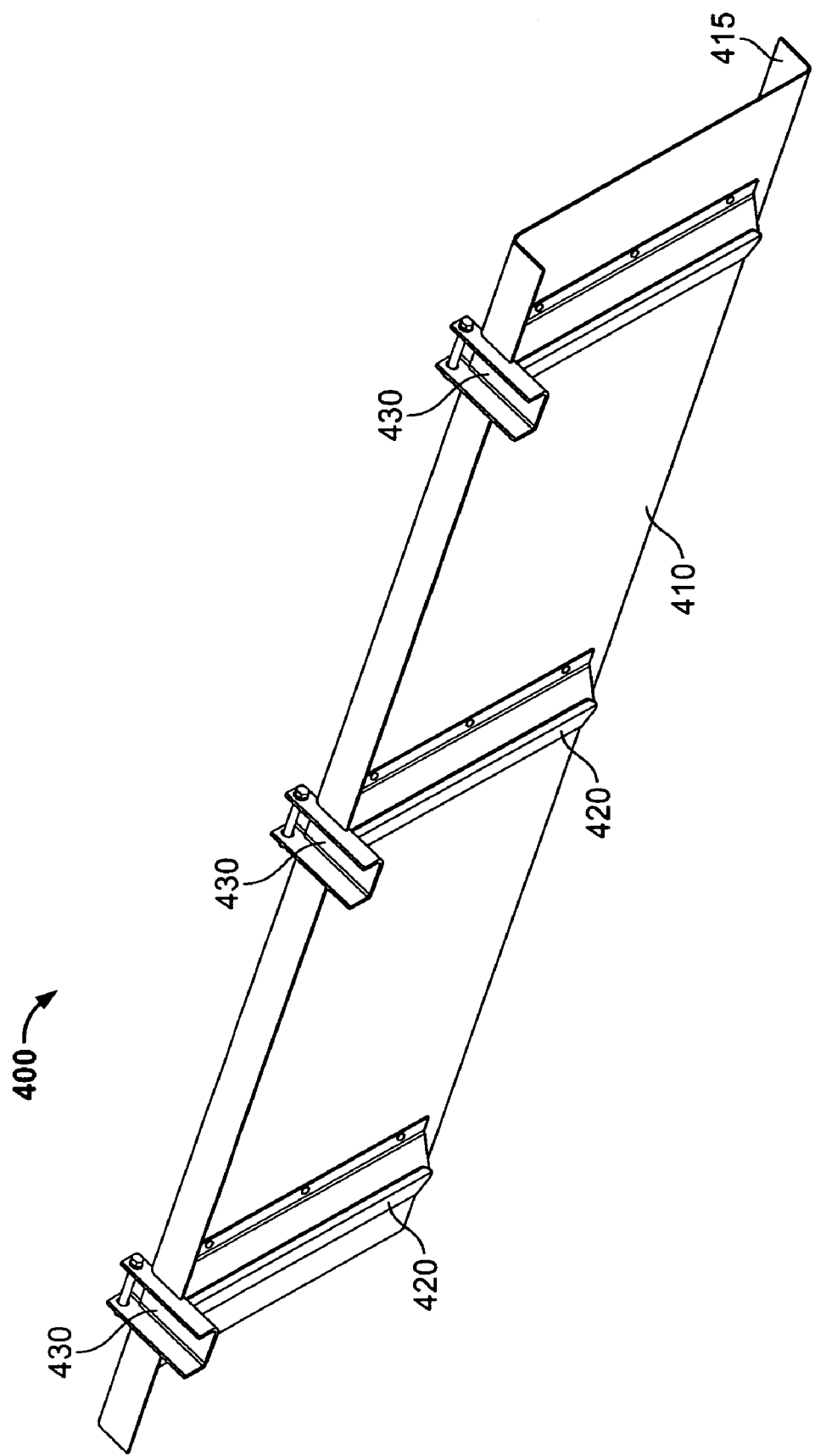
FIG. 6 is a perspective view of an embodiment of the shelf 400 of the present invention.
Figure 7A:
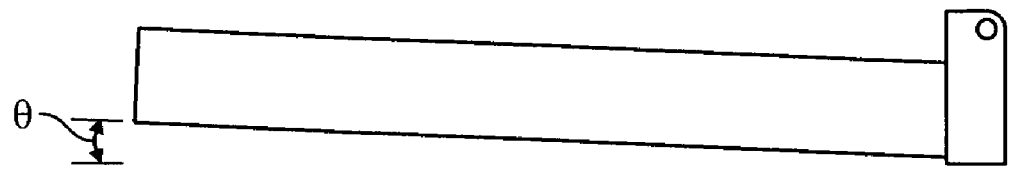
FIGS. 7A-7B are perspective views of an embodiment of the support arm 420 of the present invention.

Turning now to FIG. 6, in accordance with an embodiment of the present invention, each shelf 400 comprises a shelf member 410 having an upturned lip or edge 415 at the distal end and two or more support arms 420 attached to underside of the shelf member 410. The upturned edge 415 functions to keep the cargo or packages from sliding off the shelves 400 during transport or loading. Additionally, in the utility position, the shelves 400 can be angled slightly upward to keep the cargo from sliding off the shelves 400. The shelves 400 can be angled, with respect to the vertical member 210 (as shown for example in FIG. 1) anywhere from about 0 to about 180 degrees, depending on whether the utility of the shelves is for display (angled more than 90 degrees) or for transport (angled less than 90 degrees). For example, as shown in FIG. 7A, the distal end of the support arm 420 can be angled slightly upward θ degrees, so that the distal end is higher than the proximal end. The shelf member 410 and one or more support arms 420 can be formed or molded together as a single piece. Alternatively, the support arms 420 can bolted, riveted, welded, latched, hooked, clipped or connected by other comparable means, to the shelf member 410.

Figure 3B:
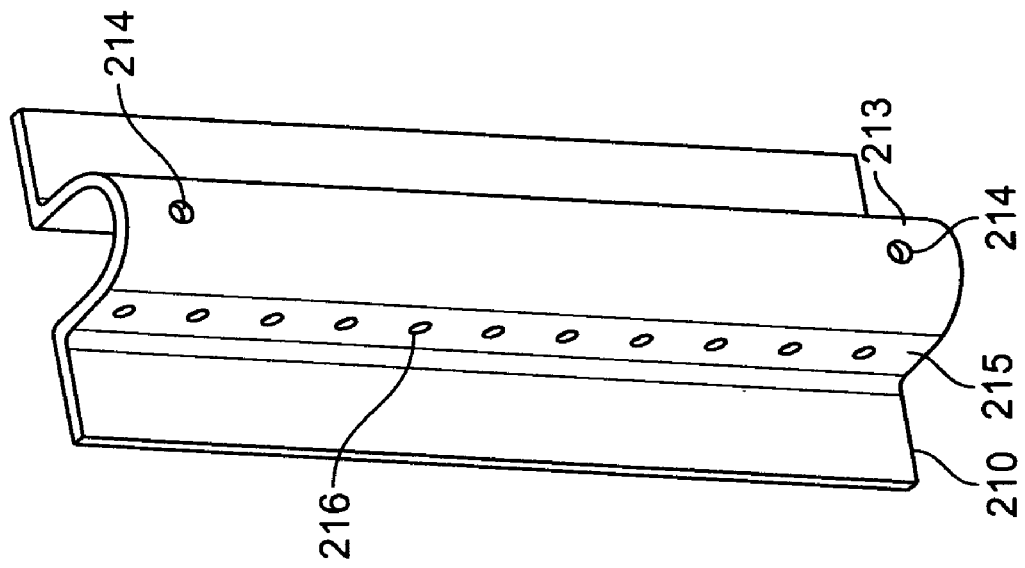
FIGS. 3A-D are perspective views of various embodiments of the vertical member 210 of the present invention.
Figure 3A:
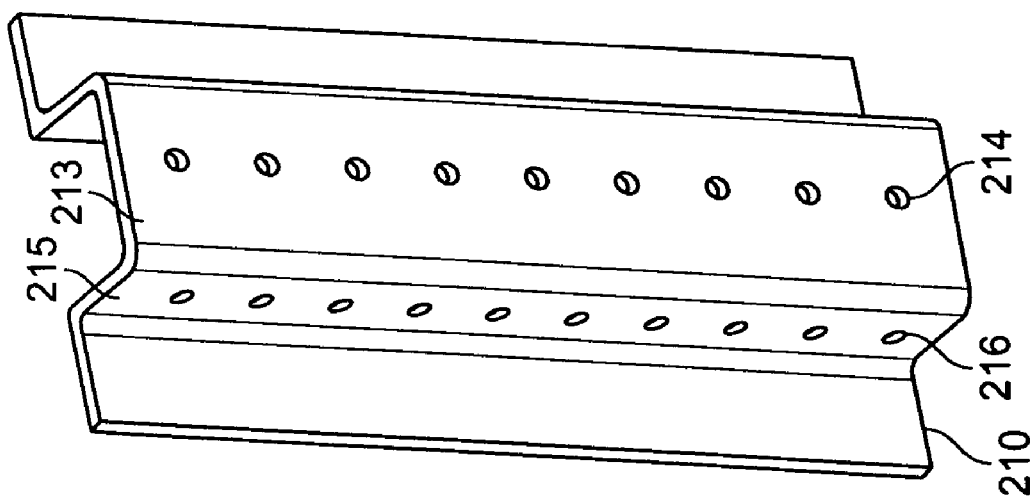
Figure 3D:
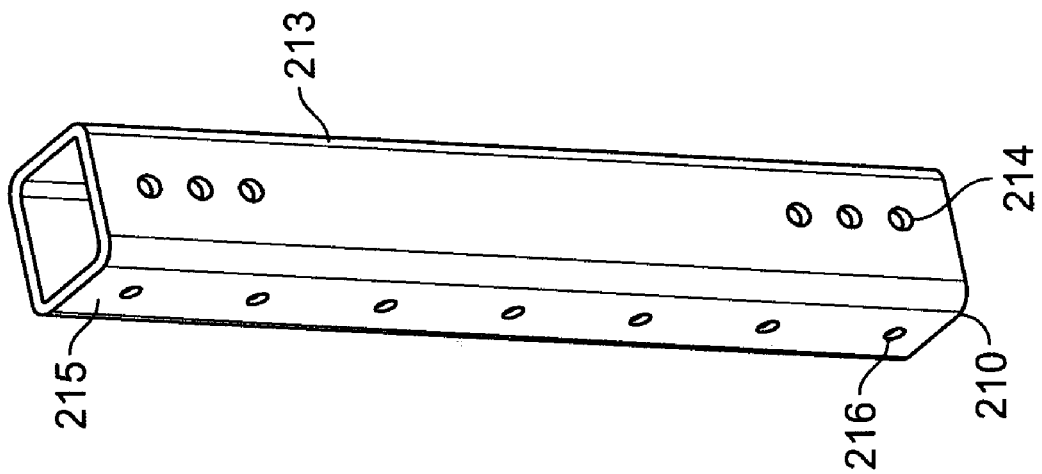
Figure 3C:
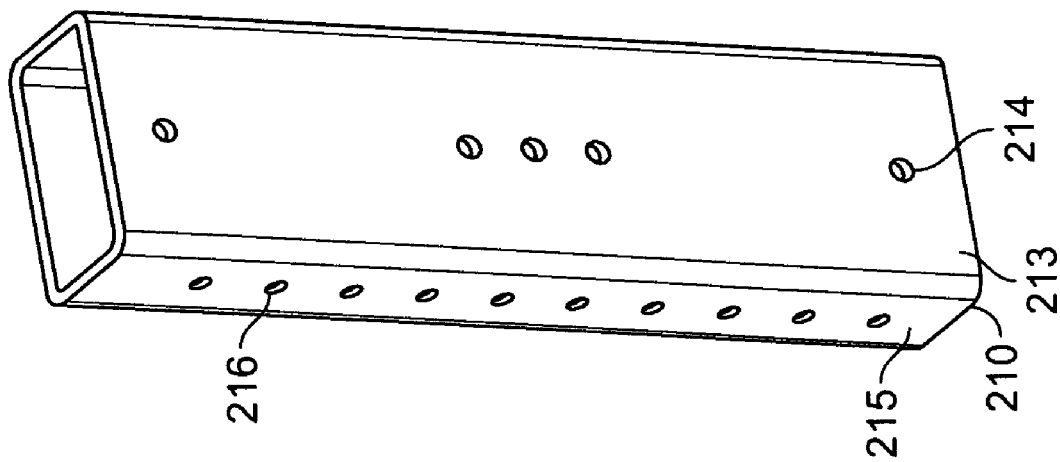
Figure 4:
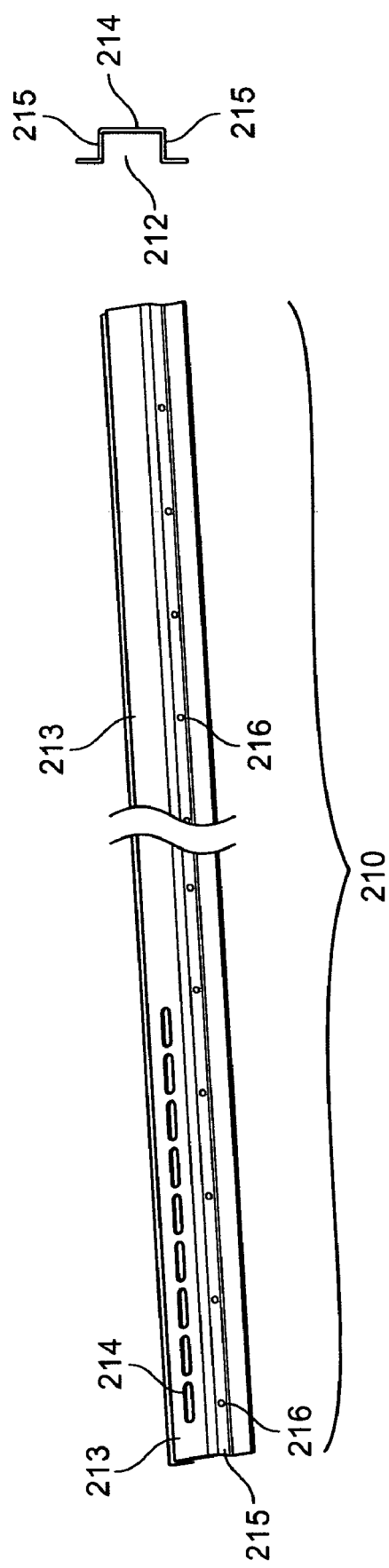
FIG. 4 is a perspective view of an embodiment of the vertical member 210 of the present invention.
Figure 7B:
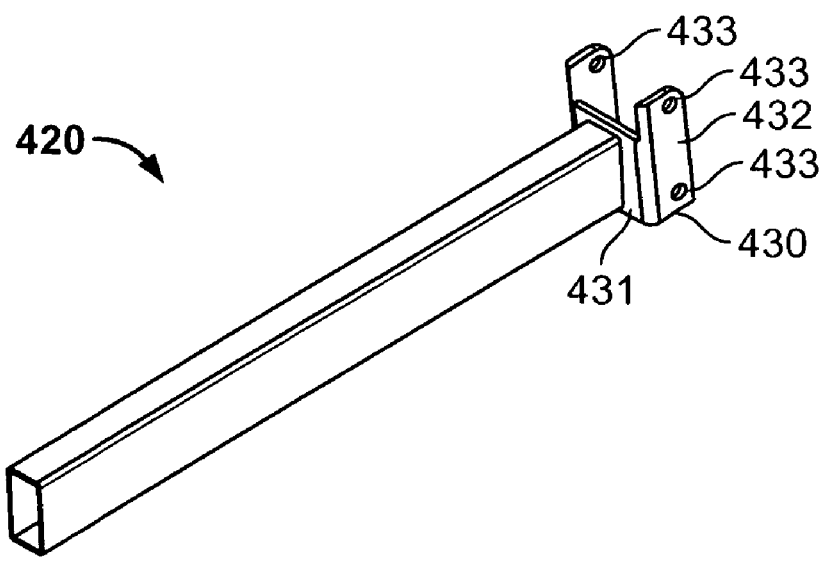
Figure 9:
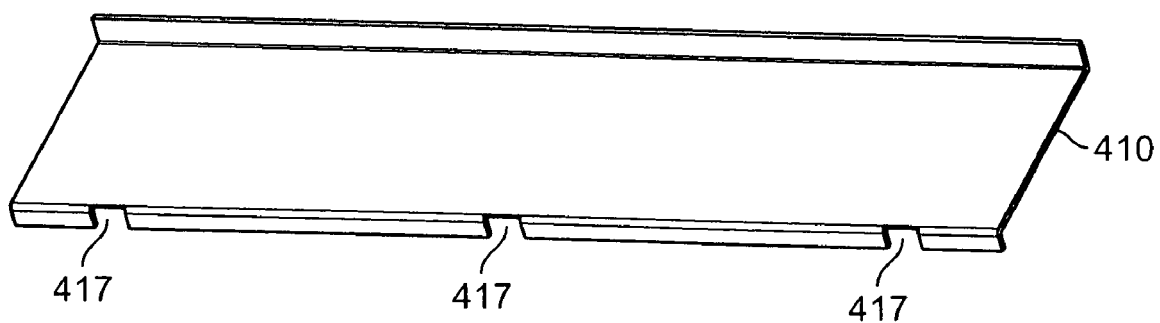
FIG. 9 is a perspective view of an embodiment of the shelf 400 of the present invention.

In accordance with an embodiment of the present invention, each support arm 420 can be formed or molded as a rectangular shaped tube as shown in FIG. 7B, an L-shaped bar, a U-channel having side flanges as shown in FIGS. 3A-B, a pair of U-channels, and the like, having a bracket 430 at its proximal end. Preferably, the shelf 410 comprises two or more indentations or cut-out portions 417 for receiving the brackets 430, as shown in FIGS. 6 and 9, thereby enabling the shelf to be mounted flush against the sidewall posts 210. Preferably, the upturned edge 415 also comprises two or more indentations or cut-out portions to enable the shelf to be mounted flush against the sidewall posts 210. Alternatively, the bracket 430 is welded, riveted or connected by other comparable means to the proximal end of the each support arm 420. Preferably, the bracket 430 can be formed or molded as a U-channel comprising a face portion 431 and two opposing side portions 432 for securing the shelf 400 to the sidewall posts 210.

accordance with an aspect of the present invention, each opposing side portion 432 of the bracket 430 comprises one or more holes or openings 433, preferably two holes. The holes 433 on the two opposing side portions 228 of the bracket 430, and the selected holes 216 on the respective opposing side portions 215 of the sidewall posts 210, are axially aligned. As shown in FIG. 1, the bracket 430 is then bolted or screwed (or by other comparable means) onto the sidewall posts 210 through the first axially aligned pair of holes 433 located towards the top of the bracket to securely and rotatably mount the supporting arm 420 and the shelf 400 to the vertical member 210. Preferably, the bracket 430 does not extend beyond the bottom of the support arm 420 so as to minimize the protrusion of the bracket when the shelves 400 are in their storage position. Additionally, the side portions 432 of the bracket 430 preferably extend beyond the shelf member 410, as shown in FIGS. 1 and 6, so that the pivot axis of the shelves 400 are above the shelf member 410. This arrangement advantageously provides that when the shelf 400 is rotated upward to its storage position, it is substantially vertical or parallel to the sidewall 110 of the box truck 100 thereby minimizing the storage space. It is appreciated that the shelf 400 is rotated downward to its utility position, which is established when the bracket 430 engages the vertical member 410, particularly the front face portion 213 of the sidewall posts 210, thereby advantageously requiring the load bearing sidewall posts 210 to support the shelves 400 and the cargo/packages thereon. This also enables the frame 200 for building a vehicular body or an enclosed structure 600 (e.g., shed, garage, field hospital, warehouse, modular building, temporary structure and the like) with a load bearing support system 205 of the present invention to carry more cargo than the conventional racking system.

To ensure that the shelves 400 stay in their utility position, the bracket 430 is additionally bolted, clipped, hooked, screwed, retained via a retaining pin (or by other comparable means) onto the sidewall posts 210, through the second axially aligned pair of holes 433 located towards the bottom of the bracket, to securely mount the supporting arm 420 and the shelf 400 to the sidewall posts 210. Accordingly, the bolt, screw or retaining pin is removed from the second axially aligned pair of holes 433 to allow upward rotation of the shelves 400 to their storage position. The supporting arm 420 can additionally include a spring mechanism to keep the shelves 400 in their storage position unless the retaining pin or bolt is inserted into the second axially aligned pair of holes 433. Alternatively, the shelves 400 are restrained in their storage position by a hook (or by other comparable means) attached to the side portion 300.

Although the various embodiments of the present invention are described in conjunction with the box truck 100 and enclosed structure 600, it is appreciated that the frame 200 for building a vehicular body or exterior panels 610 with a load bearing support system 205 has a wide range of applications in permanent and temporary housing (e.g., warehouses, field hospitals, modular building), delivery, service and cargo vehicles, such as cargo planes, vans, trailers, trains, container ships, service trucks, or emergency vehicles wherein the shelves 400 are replaced with benches or cots, and the like, to hold patients.

Figure 11:
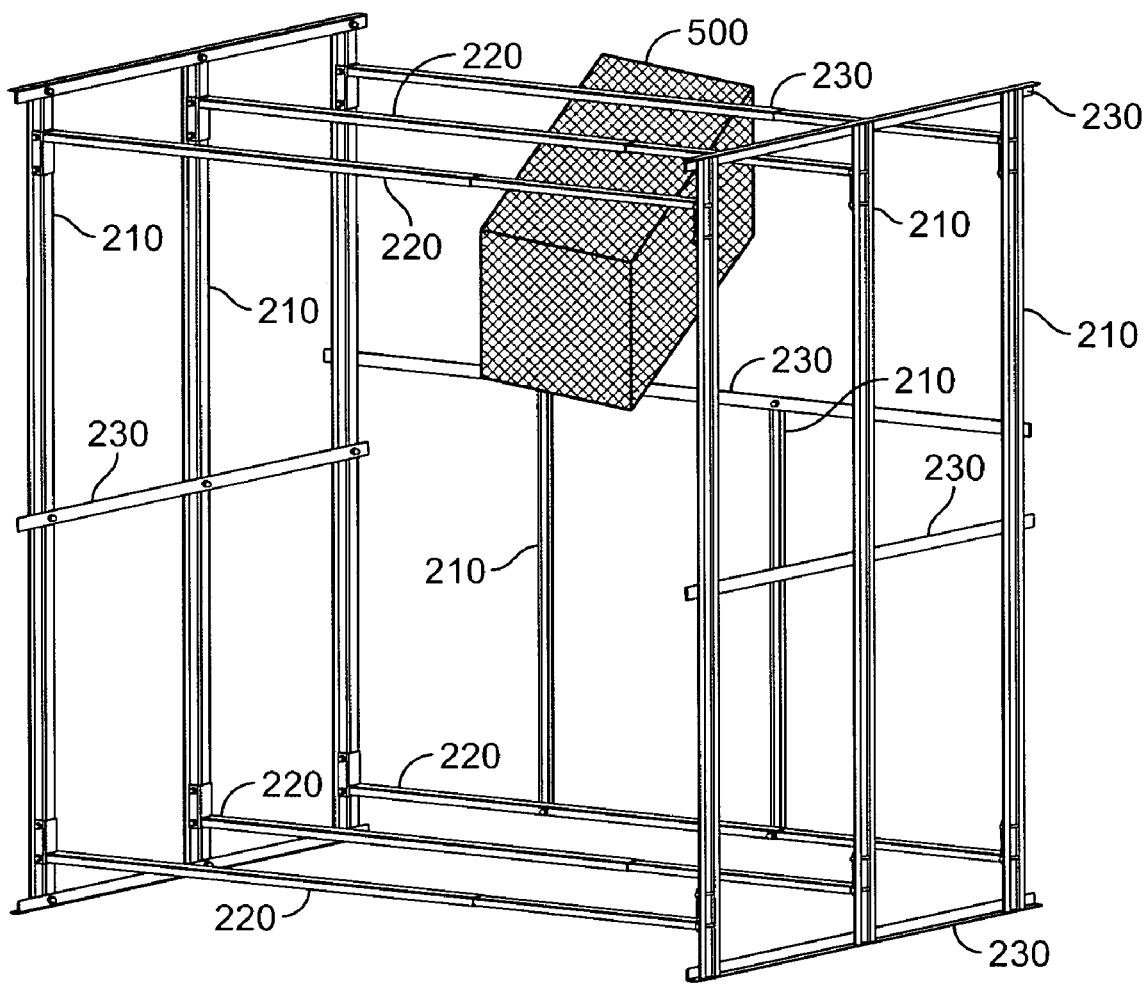
FIG. 11 is a pictorial perspective of a frame in accordance with an embodiment of the present invention for building a cargo box or an enclosed structure with a load bearing support system for constructing a cargo box or an enclosed structure.
Figure 12:
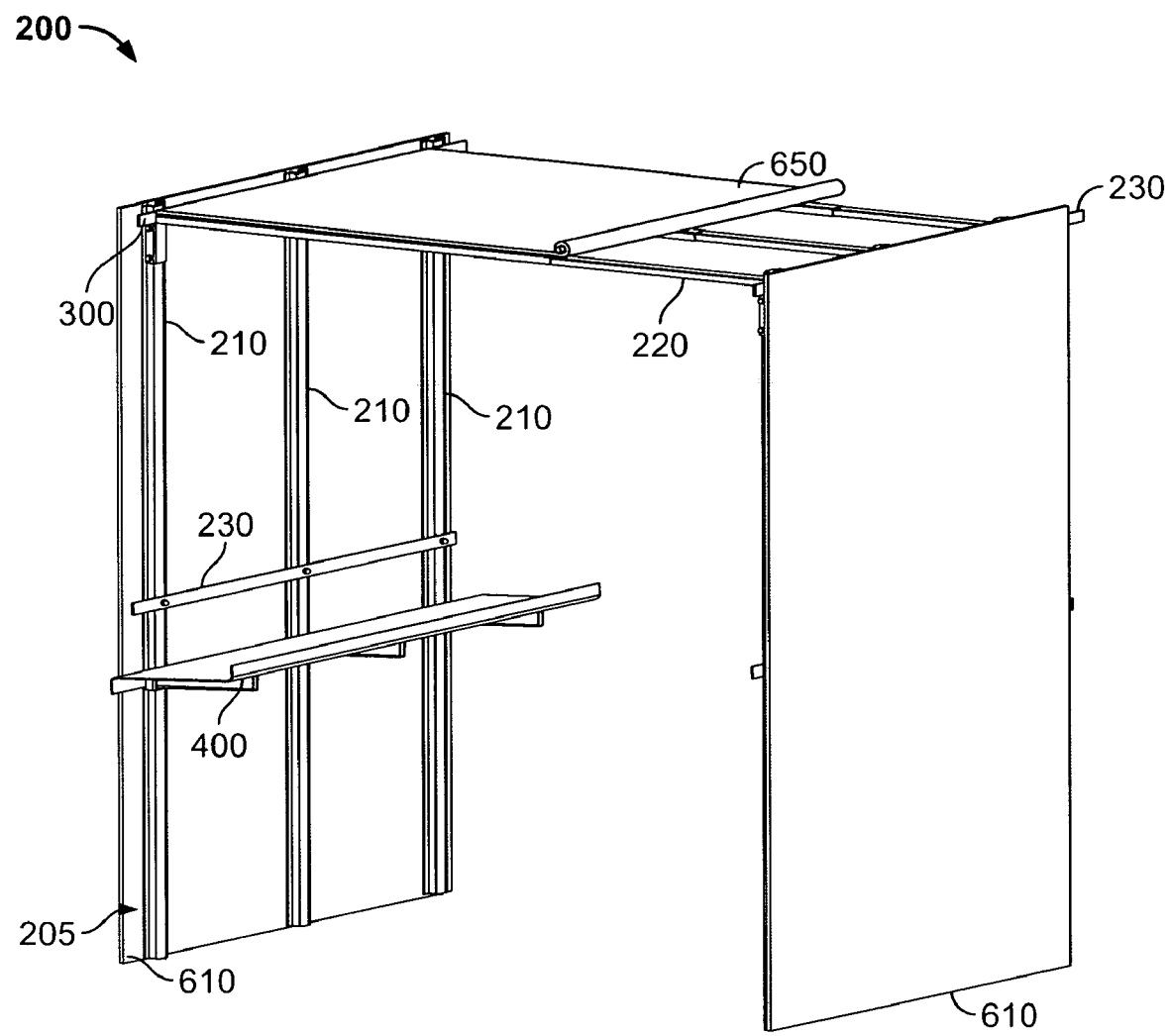
FIG. 12 is a pictorial perspective of a frame in accordance with an embodiment of the present invention for building an enclosed structure or cargo box with a load bearing support system.
Figure 13:
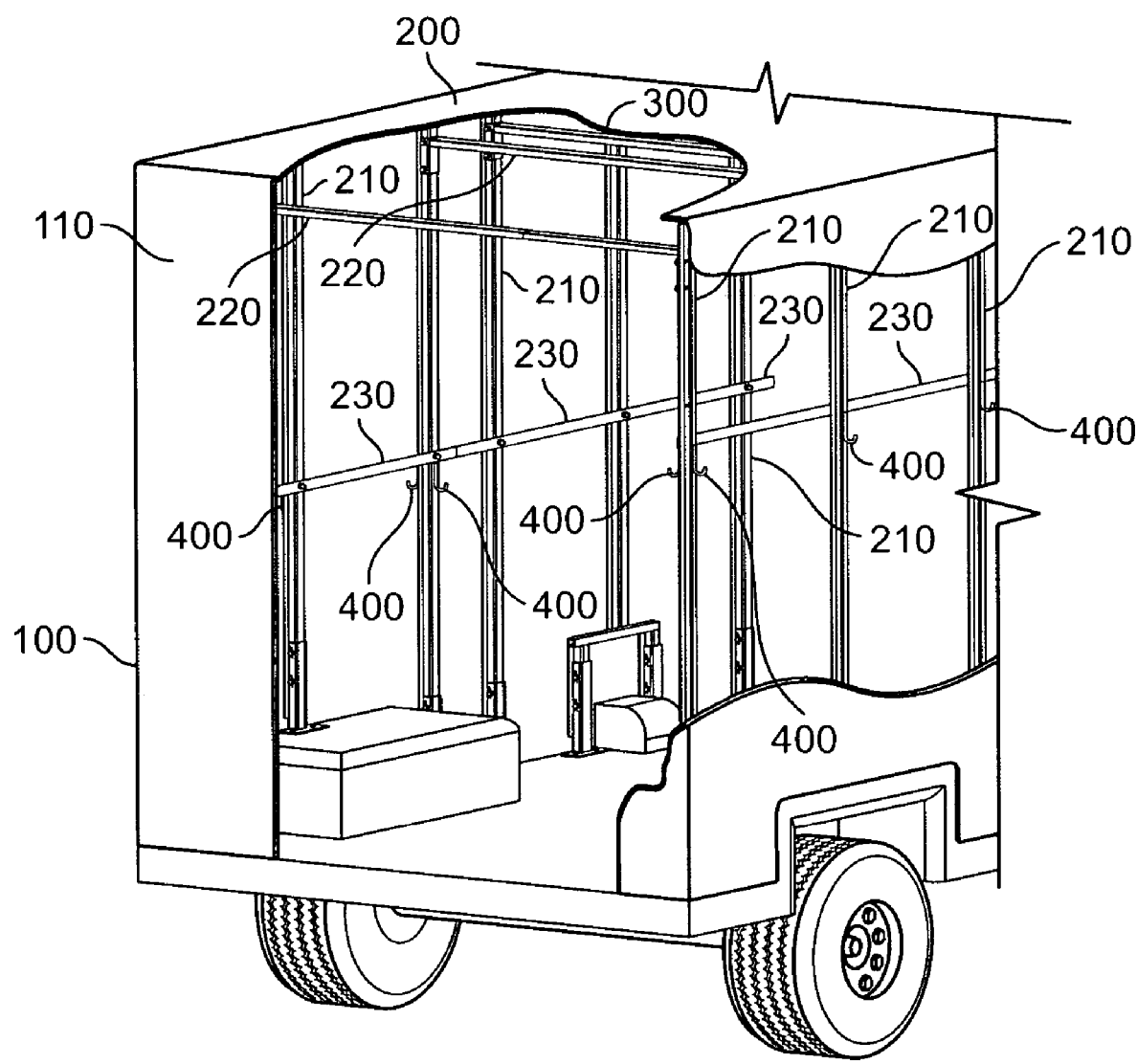
FIG. 13 is a pictorial perspective view of a box truck without the right side wall of the cargo area built using the frame with a load bearing support system in accordance with an embodiment of the present invention.

Turning now to FIG. 11, in accordance with an embodiment of the present invention, a skeleton or frame 200 can be utilized to build a box truck, trailer, refrigeration unit, cargo box, enclosed structure, building, shed, warehouse, and the like. That is, for a box truck application, the sidewalls 110, the rear wall 120, the front wall 130, the floor 140 and the roof 150 can be attached to at least one of the following: the stabilization bar member 230, the sidewall posts 210 and the transverse member 220 of the frame 200 via any connection means, such as bolts, latches, rivets, hooks, clips, clasps, pins, etc. In other words, the frame 200 of the present invention can serve as a load bearing support system 205 for mounting any accessories, such as walls, roofs, shelves, doors, windows, floors, refrigeration or air conditioner unit 500, ladder racks and the like, to pre-build any structure or vehicular body of cargo box or cargo vehicle.

Figure 15:
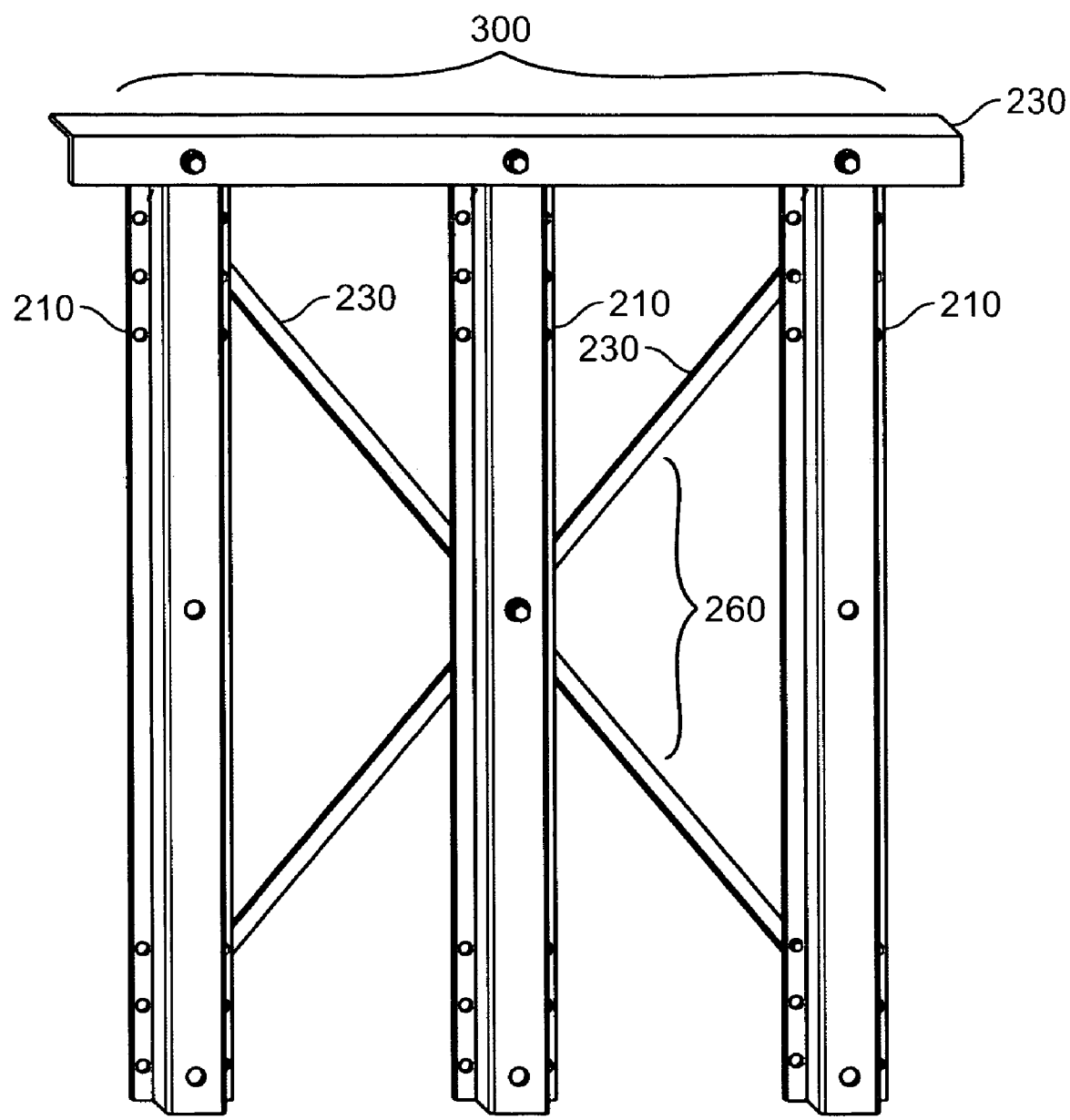
FIG. 15 is a pictorial perspective of the side portion of the present invention with a cross brace attached.

Turning now to FIG. 15, there is shown an embodiment of the side portion 300 of the frame 200 of the present invention. The side portion 300 comprises at least three sidewall posts 210 and at least two stabilization bar members 230 forming a cross brace 260. The cross brace 260 provides added stability and facilitates alignment of the longitudinally spaced sidewall posts 210. In accordance with an aspect of the present invention, each stabilization bar member 230 comprises a tension wire or cable for adjusting the tension of the cross brace 260. Additionally, each stabilization bar member 230 can comprise a wire, a flat bar or round bar made of any durable material, such as metal, plastic, wood, etc. Each end of the respective stabilization bar members 230 can be attached to a different sidewall post 210 within the same side portion 300 by a bolt, rivet, screw, clip, nail, glue, epoxy, or by any other means. Furthermore, where the stabilization bar members "cross", they can attach to each other, to another vertical member 210, or to both, by a bolt, screw, rivet, nail, clip, glue, epoxy, or by any other means.

In accordance with aspect of the present invention, the transverse members 220 can form a cross brace (not shown) but similar to the cross brace 260. Each end of the respective transverse members can be attached to a different vertical member 210 (not shown), or, alternatively, to a different stabilization bar member 230 by a bolt, rivet, screw, clip, nail, glue, epoxy, or by any other means. Similarly to the cross brace 260 shown in FIG. 15, where the transverse members "cross", they can attach to each other, to another transverse member 220 (not shown), or to both, by a bolt, screw, rivet, nail, clip, glue, epoxy, or by any other means.

Figure 16:
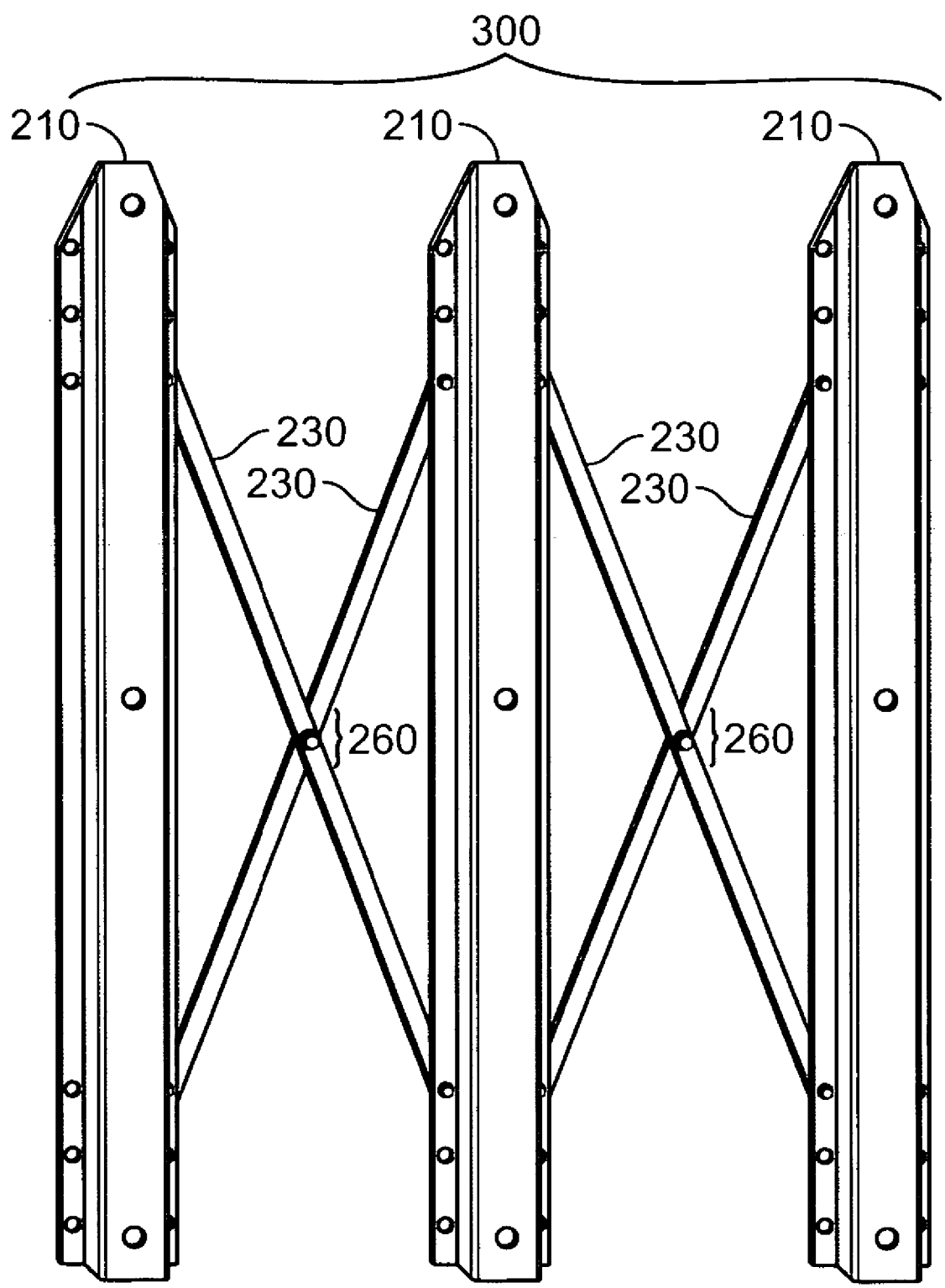
FIG. 16 is a pictorial perspective of the side portion of the present invention without a stabilization bar member and with two attached cross braces.

In accordance with an embodiment of the present invention, although FIG. 16 shows a side portion 300 with three vertical members 210 and two cross braces 260, it is appreciated that one or more cross braces 260 can be used to attached two or more sidewall posts 210. Although not shown, this applies equally to the cross brace formed from the transverse members 220. This facilitates expansion and contraction of the frame 200 of the present invention to accommodate building covers or panels 610 for cargo vehicles or cargo boxes of varying dimension. The cross brace 260 also provides added stability. As discussed herein, the stabilization bar members 230 can comprise a tension wire or cable. These stabilization bar members 230 can be loosened, unattached, and then reattached to different parts of the same respective vertical members 210 and retightened, to allow the vertical members 210 in the same respective side portion 300 to move closer to one another. This embodiment of the present invention frees up cargo space in the cargo area of the box truck 100 (not shown). Preferably, the end of the stabilization bar member 230 can be vertically adjusted on the sidewall posts 210 using any known means, e.g., a slide hole or multiple holes, etc.

It will be understood that other and further improvements and changes can be made to the exemplary embodiments disclosed herein without departing from the spirit and scope of the present invention.

What is claimed is:

1. A frame for building a vehicular body of a cargo box or vehicle with a load bearing support system, comprising:
   at least two opposing side portions, each side portion comprising a plurality of longitudinally spaced sidewall posts, each sidewall posts connected to another sidewall posts of the same respective side member by one or more stabilization bar member to provide stability and alignment of said plurality of longitudinally spaced sidewall posts; and
   at least one transverse member, said at least one transverse member connects opposing sidewall posts in the respective opposing side portions to form said frame for mounting a panel of said vehicular body and comprising said load bearing support system for supporting one or more levels of accessories, thereby providing one or more additional levels of load bearing surfaces for said cargo vehicle; and
   wherein each of the opposing side portions comprises an internal side and an external side, wherein said accessory is mounted on the internal side of an opposing side portion; and wherein said panel is mounted on the external side of said opposing said portion.

2. The frame of claim 1, wherein said at least one transverse member is an adjustable transverse member such that the length of said at least one transverse member is adjustable.

3. The frame of claim 1, wherein said panel comprises one or more of the following: a roof, a wall, a refrigerator unit, a floor, an air conditioner unit, a sunroof, a door or a window.

4. The frame of claim 1, wherein said accessory is molded with one or more support arms, wherein each support arm comprises a bracket at the proximal end for connecting said support arm to a vertical member.

5. The frame of claim 1, wherein said accessory is at least one of the following: a shelf, a bench, a cot, a platform, a drawer, a bin, a bucket, a sliding rack, a cabinet, a hook, or a rack.

6. The frame of claim 1, wherein said accessory is a load bearing surface, wherein said load bearing surface is connected to one or more said sidewall posts, and wherein said load bearing surface is held at an angular position with respect to said sidewall posts from about 0 to about 180 degrees.

7. The frame of claim 1, wherein said at least one transverse member comprises a bracket at each end for connecting said at least one transverse member to opposing vertical members of the respective opposing side frames.

8. The frame of claim 1, wherein said at least one transverse member is a telescopic member comprising an outer member and an inner member, wherein said inner member is insertable into said outer member and moves with respect to said outer member to adjust the length of said at least one transverse member.

9. The frame of claim 1, wherein at least one or more of said members or said sidewall posts are non-uniform in size or shape to build said vehicular body of varying dimensions.

10. The frame of claim 1, wherein the number of said plurality of longitudinally spaced sidewall posts and the longitudinal spacing between said each sidewall posts in each opposing side portion varies to build said vehicular body of varying dimensions.

11. The frame of claim 1, wherein said plurality of longitudinal spaced sidewall posts, said one or more stabilization bar member and said at least one transverse member are constructed of at least one of the following suitable load bearing material: steel, aluminum, plastic, vinyl, plastic resin, fiberglass, and fiberglass reinforced plywood.

12. The frame of claim 1, wherein said cargo vehicle is one of the following: truck, van, trailer, train, plane, freight, container vessel or ship.

13. The frame of claim 1, wherein at least one level of accessories comprises a load bearing surface, wherein said load bearing surface is one of the following: a shelf, bench, cot, platform, drawer, bin, bucket, sliding rack, cabinet, hook, or rack.

14. The frame of claim 1, wherein said members and sidewall posts of said frame are manufactured in a predetermined size and are cut accordingly to build said vehicular body of varying dimensions.

15. The frame of claim 1, further comprising a cross brace formed of at least two stabilization bar members.

16. The frame of claim 15, wherein said cross brace connects at least two different longitudinally spaced sidewall posts.

17. The frame of claim 1, further comprising a cross brace formed of at least two transverse members.

18. The frame of claim 17, wherein said cross brace connects said opposing side portions.

19. A frame for building a vehicular body of a cargo vehicle with a load bearing support system manufactured by the process comprising the steps of:
   assembling at least two opposing side portions, wherein each side portion comprises a plurality of longitudinally spaced load bearing sidewall posts, by connecting each said sidewall posts to another sidewall post within each respective side portion by one or more stabilization bar member to provide stability and alignment of said plurality of longitudinally spaced sidewall posts; and
   connecting opposing sidewall posts in the respective opposing side portions by at least one transverse member to form said frame for mounting a panel of said vehicular body with said load bearing support system for supporting one or more levels of accessories, thereby providing one or more additional levels of load bearing surfaces for said cargo vehicle; and
   wherein each of the opposing side portions comprises an internal side and an external side; and wherein said accessory is mounted on the internal side of an opposing side portion; and wherein said panel is mounted on the external side of said opposing side portion.

20. The process of claim 19, wherein said at least one transverse member is an adjustable transverse member such that the length of said at least one transverse member is adjustable.

21. The process of claim 19, wherein said accessory is at least one of the following: a shelf, a bench, a cot, a platform, a drawer, a bin, a sliding rack, a cabinet, a bucket, or a rack.

22. The process of claim 19, wherein said at least one transverse member is a telescopic member comprising an outer member and an inner member, wherein said inner member is insertable into said outer member and moves with respect to said outer member to adjust the length of said at least one transverse member.

23. The process of claim 19, wherein said panel comprises one or more of the following: a roof, a wall, an air conditioner unit, refrigerator unit, a floor, a door, a sunroof or a window.

24. The process of claim 19, wherein said cargo vehicle is one of the following: truck, van, trailer, train, plane, freight, container vessel and ship.

25. The process of claim 19, wherein said sidewall posts and said members of the support system are manufactured in a predetermined size and are cut accordingly to build said vehicular body of varying dimensions.

26. The process of claim 19, wherein at least one level of accessories comprises a load bearing surface, wherein said load bearing surface is one of the following: a shelf, bench, cot, platform, drawer, bin, bucket, sliding rack, cabinet, hook, or rack.

27. The process of claim 19, wherein said plurality of longitudinal spaced sidewall posts, said one or more stabilization bar member and said at least one transverse member are constructed of at least one of the following suitable load bearing material: steel, aluminum, plastic, vinyl, plastic resin, fiberglass, and fiberglass reinforced plywood.

28. The process of claim 19, wherein the number of said plurality of longitudinally spaced sidewall posts and the longitudinal spacing between said each sidewall posts in each opposing side portion varies to build said vehicular body of varying dimensions.

29. A kit for assembling a frame for building a vehicular body with a load bearing support system for use in a cargo vehicle, the kit comprising:

a plurality of load bearing sidewall posts for forming at least two opposing side portions;

one or more stabilization bar members for connecting said vertical members of each respective side portion to provide stability and alignment of said plurality of load bearing sidewall posts; and at least one transverse member for connecting said opposing sidewall posts in the respective opposing side portion to form said frame for mounting a panel of said vehicular body and comprising said load bearing support system for supporting one or more levels of accessories, thereby providing one or more additional levels of load bearing surfaces for said cargo vehicle; and wherein each opposing side portion having an internal side and an external side; wherein said accessory is mounted on the internal side of an opposing side portion; and wherein said panel is mounted on the external side of said opposing side portion.

30. The kit of claim 29, wherein said sidewall posts and members of the support system are manufactured in a predetermined size and are cut accordingly to build said vehicular body of varying dimensions.

31. The kit of claim 29, wherein said at least one transverse member is an adjustable transverse member such that the length of said at least one transverse member is adjustable.

32. The kit of claim 29, wherein said accessory is at least one of the following: a shelf, a bench, a cot, a platform, a drawer, a cabinet, a sliding rack, a bin, a hook, a bucket, or a rack.

33. The kit of claim 29, wherein said at least one transverse member is a telescopic member comprising an outer member and an inner member, wherein said inner member is insertable into said outer member and moves with respect to said outer member to adjust the length of said at least one transverse member.

34. The kit of claim 29, wherein said kit further comprises instructions for assembling said frame for building said vehicular body with said load bearing support system for use in said cargo vehicle.

35. The kit of claim 29, wherein said load bearing surface is one of the following: a shelf, rack, bin, bench, cot, drawer, cabinet, bucket, hook, sliding rack, and platform.

36. The kit of claim 29, wherein said panel comprises one or more of the following: a roof, a wall, a refrigerator unit, an air conditioner unit, a floor, a door or a window.

37. The kit of claim 29, wherein the number of said plurality of longitudinally spaced sidewall posts in each opposing side portion varies to build said vehicular body of varying dimensions.

38. The kit of claim 29, wherein said plurality of load bearing sidewall posts, said one or more stabilization bar member and said at least one transverse member are constructed of at least one of the following suitable load bearing material: steel, aluminum, plastic, vinyl, plastic resin, fiberglass, and fiberglass reinforced plywood.

39. The kit of claim 29, further comprising a cross brace formed of at least two stabilization bar members.

40. The kit 39, wherein said cross brace connects at least two different longitudinally spaced load bearing sidewall posts.

41. The kit of claim 29, further comprising a cross brace formed of at least two transverse members.

42. The kit of claim 41, wherein said cross brace connects said opposing side frames.

* * * * *